D. P. DAVIES.
STEERING MECHANISM FOR TRACTION ENGINES AND THE LIKE.
APPLICATION FILED JULY 30, 1910.
1,045,952.
Patented Dec. 3, 1912.
2 SHEETS—SHEET 1.
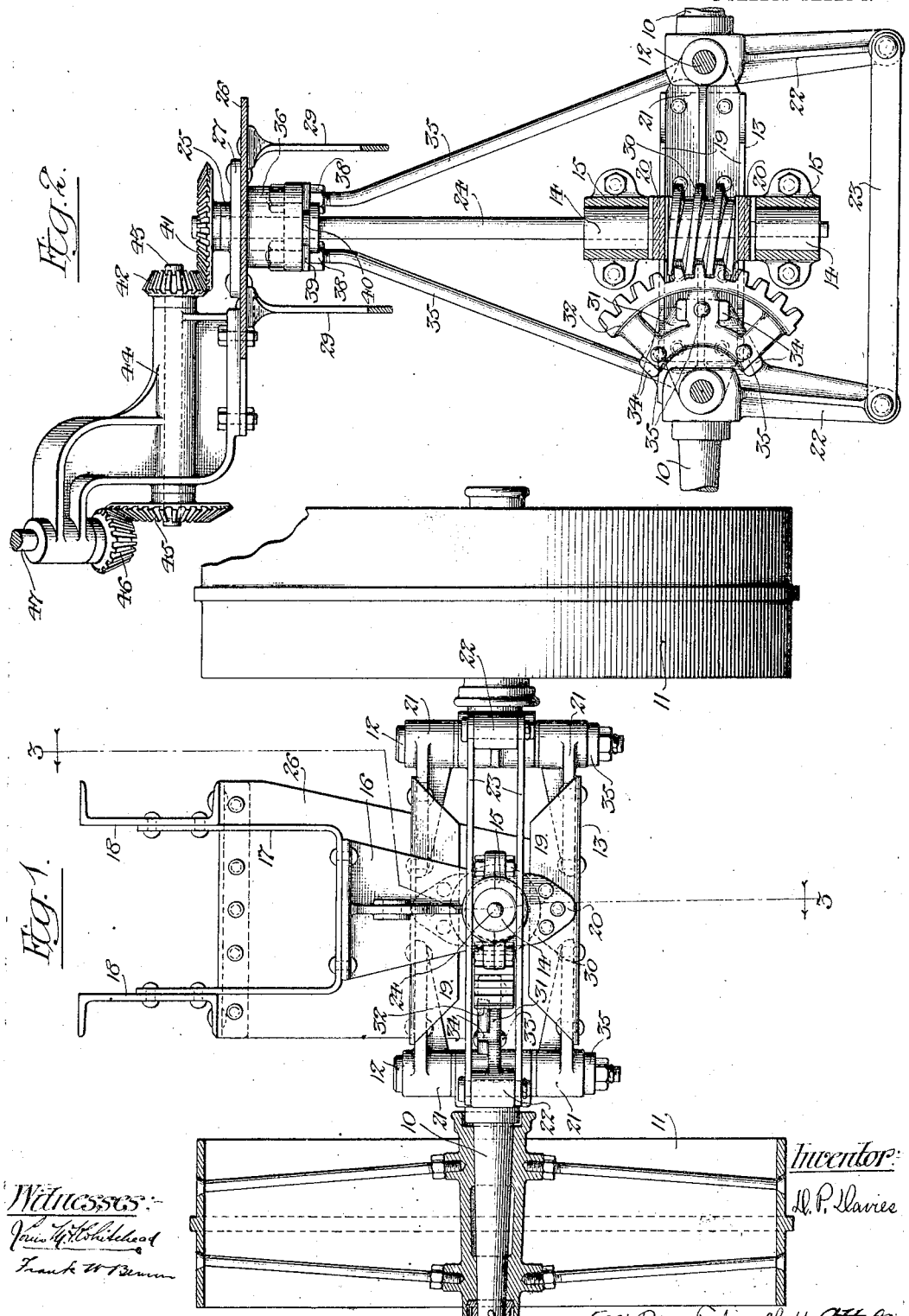

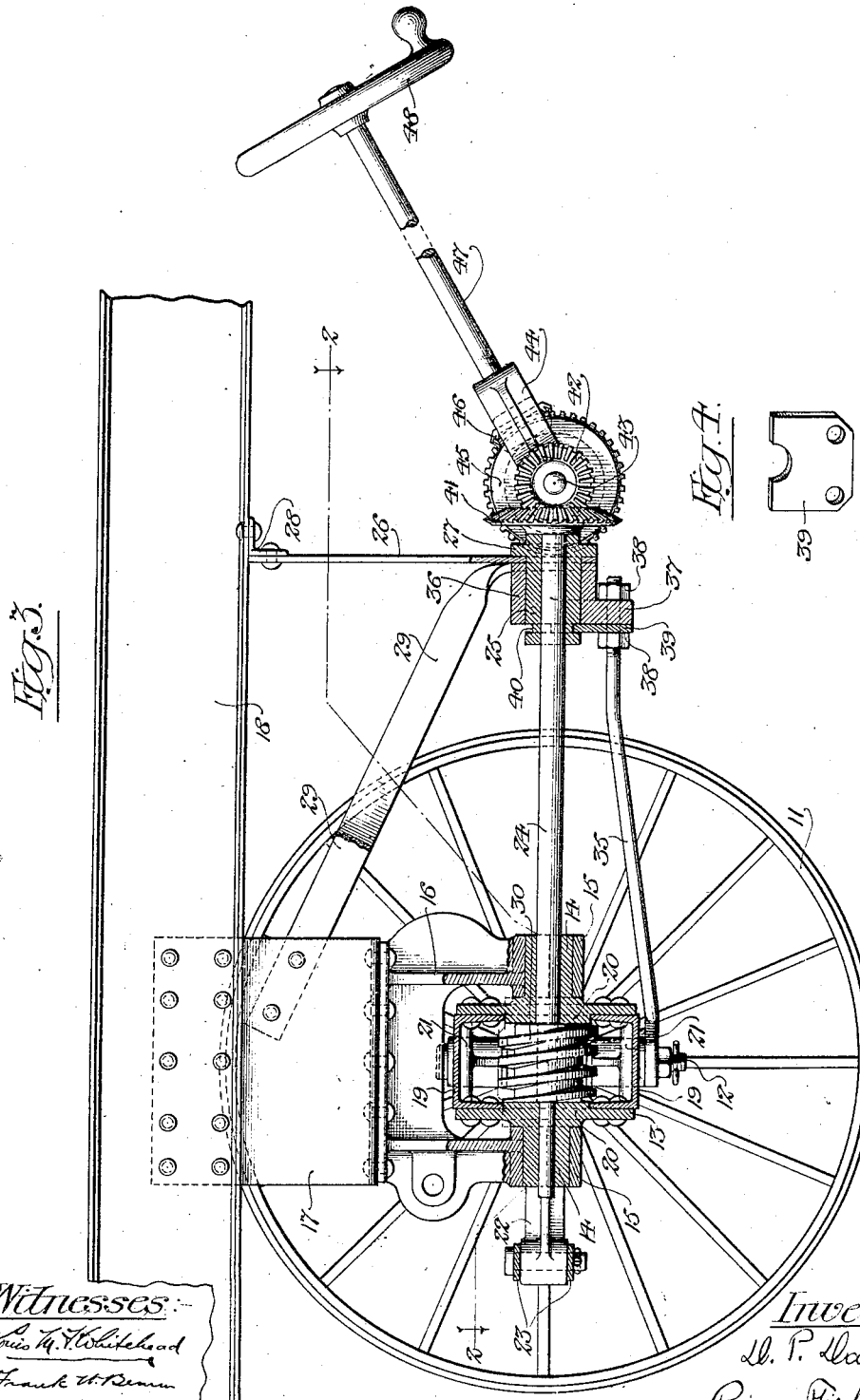

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

STEERING MECHANISM FOR TRACTION-ENGINES AND THE LIKE.

1,045,952. Specification of Letters Patent. Patented Dec. 3, 1912.

Application filed July 30, 1910. Serial No. 574,718.

*To all whom it may concern:*

Be it known that I, DAVID P. DAVIES, a citizen of the United States, and a resident of Racine, county of Racine, and State of Wisconsin, have invented certain new and useful Improvements in Steering Mechanism for Traction-Engines and the Like, of which the following is a full, clear, and exact description.

The invention relates to steering mechanism for traction engines and the like, and seeks to provide a simple and effective steering gear which is durable in construction and which may be easily operated. The steering axle for traction engines is usually centrally and horizontally pivoted so that it can swing in a transverse vertical plane and permit the wheels of the steering axle to rise and fall as they pass over obstructions or depressions without tilting the frame of the engine. The present invention is adapted to this form of steering axle and consists in the features of improvement hereinafter set forth, illustrated in the preferred form in the accompanying drawings and more particularly pointed out in the appended claims.

In the drawings, Figure 1 is a front elevation of the improved steering mechanism with one of the wheels of the steering axle shown in section. Fig. 2 is a detail plan view with parts shown in section on the line 2—2 of Fig. 3. Fig. 3 is a central longitudinal section on the line 3—3 of Fig. 1. Fig. 4 is a perspective view of a plate forming part of the bracing means for the steering axle.

The stub axles 10, whereon the steering wheels 11 are mounted, are connected at their inner ends by vertical pivot pins 12 to the ends of the transverse axle support 13. The axle support is centrally and horizontally pivoted on the frame of the traction engine to swing in a transverse vertical plane. In the preferred form shown, it is provided with forwardly and rearwardly projecting pivots 14 which are journaled in bearings 15 upon the lower end of a bracket 16. This bracket is riveted to the lower end of a U-shaped plate 17 which in turn is riveted at its upper end to channel bars 18 which form the sills of the machine frame.

If desired, the transverse axle support may be formed of a single casting. In the construction illustrated, it comprises upper and lower channel bars 19 that are connected intermediate their ends by castings 20 which carry the pivots or journals 14 of the axle support. Projecting pieces 21 riveted to the ends of the channels 19 form bearings for the upper and lower ends of the vertical pivot bolts 12 which extend through the inner ends of the stub axles 10. Each of the stub axles is provided at its inner end with a projecting crank arm 22 and the ends of these arms are connected by links 23, so that the stub axles shift together to steer the machine.

The wheels 11 are shifted upon their vertical pivots by gearing driven from a longitudinally extending shaft 24 arranged in line with the axis of the axle support 13. Preferably, the forward end of this shaft extends through and is journaled in the pivots 14 of the axle support. Its rear end is journaled in a bearing 25 (see Figs. 2 and 3) which is secured to the framework of the machine. In the form shown, this bearing is arranged within an opening in the lower end of a plate 26 and is provided with a flange 27 by which it is riveted to the plate. The plate is secured at its upper edge by an angle bar 28 to the lower edges of the sills 18 and inclined brace bars 29 extend between the lower portion of the plate and the U-shaped piece 17.

A worm 30 is fixed to the shaft 24 between the vertical pivots 12 of the stub axles 10. In the form shown, the worm is arranged between the front and rear castings 20 of the transverse axle support. One of the stub axles 10 is provided with an inwardly projecting part 31 which has a segmental worm wheel 32 that engages the worm 30 upon the operating shaft 24. Preferably, the segmental worm wheel 32 is detachably connected by rivets 33 to the part 31 of the stub axle and the latter is provided with upwardly projecting lugs 34 which engage the ends and the central spoke of the segmental worm wheel, so that the latter is rigidly and detachably held in position. By this arrangement the worm gear can be readily renewed when it becomes worn. By rotating the operating shaft 24, the worm gearing will turn the stub axles 10 to steer the machine. At the same time the axle support 13 and the stub axles and wheels carried thereby are free to swing in a transverse vertical plane, so that the wheels can rise and fall in passing over obstructions or depressions without tilting the machine.

To relieve the strain upon the axle support and its bearings, a pair of brace rods 35 extend between the ends of the axle support and a member 36 which is carried by the machine frame and which is rotatably mounted in line with the axis of the axle support. In the form shown, this member 36 is rotatably mounted upon the bearing 25 for the rear end of the operating shaft 24. The forward ends of the inclined brace rods 35 are provided with eyes which engage the lower ends of the vertical pivot bolts 12. The rear ends of these rods are threaded, extend through a depending flange 37 on the rotatable member 36 and are securely connected thereto by nuts 38. The rear end of the rotatable member 36 abuts against the plate 26. A plate 39 mounted upon the rear ends of the brace rods 35 is held against the forward end of the rotatable member by two of the nuts 38. The upper notched edge of this plate engages an annular groove 40 formed in the forward end of the bearing 25. By this arrangement, the rotatable member 36 is rigidly held against longitudinal movement and the rods 35 connected thereto, brace the ends of the axle support and the pivots of the axle stubs, so as to relieve the strain brought upon the bearings of these parts when the wheels 11 strike obstructions. At the same time, the brace rods 35 and the member 36 to which they are connected, are free to oscillate with the axle support 13.

The operating shaft 24 of the steering gear can be rotated in any suitable manner. In the form shown, it is connected at its rear end by intermeshing beveled gears 41 and 42 to a transverse counter shaft 43. This shaft is journaled in a bracket 44 that is bolted to the rear face of the plate 26. The counter shaft 43 is connected by the intermeshing beveled gears 45 and 46 to a shaft 47. This shaft is journaled at its forward end in a bearing in the bracket 44 and extends upwardly and rearwardly therefrom to the driver's position on the machine, where it is provided with a hand wheel 48 or other suitable means by which it may be rotated. The beveled pinions 41, 42, 45 and 46 constitute a convenient form of speed reducing gearing between the hand wheel 48 and operating shaft 24, so that the latter may be readily rotated to steer the machine.

It is obvious that numerous changes may be made in the details set forth without departure from the essentials of the invention, as defined in the claims.

I claim as my invention:—

1. In steering mechanism for traction engines and the like, the combination with the frame, of an axle support centrally and horizontally pivoted in the frame to swing in a transverse vertical plane, connected stub axles vertically pivoted to the ends of said support, a shaft journaled in said support in line with the axis thereof, a worm on said shaft, a worm wheel fixed to one of said stub axles and engaging said worm and means for rotating said shaft.

2. In steering mechanism for traction engines and the like, the combination with the frame, of a bracket depending therefrom, a transverse axle support centrally and horizontally pivoted on said bracket, stub axles vertically pivoted to the ends of said support, crank arms fixed to said axles, a connecting link between said crank arms, a longitudinally extending shaft journaled in said support in line with the axis thereof, a worm fixed to said shaft, a segmental worm wheel secured to one of said stub axles and engaging said worm, and means for rotating said shaft.

3. In steering mechanism for traction engines and the like, the combination with the frame, of an axle support pivotally mounted in the frame to swing in a transverse vertical plane, stub axles vertically pivoted to the ends of said support, a member rotatably mounted in a portion of said frame in line with the axis of said support, braces connected to the ends of said support and to said member and means for shifting said stub axles.

4. In steering mechanism for traction engines and the like, the combination with the frame, of a transverse axle support centrally and horizontally pivoted to said frame to swing in a transverse vertical plane, stub axles vertically pivoted to the ends of said support, a rotatable member arranged in line with the axis of said support, means for bracing said rotatable member and for holding the same against longitudinal movement and brace bars extending between said member and the vertical pivots of said stub axles.

5. In steering mechanism for traction engines and the like, the combination with the frame, of a bracket depending therefrom, a transverse axle support centrally and horizontally pivoted on said bracket, connected stub axles vertically pivoted to the ends of said support, a longitudinally extending shaft journaled at its forward end in said support in line with the axis thereof, worm gearing connecting said shaft and said stub axles, a member rotatably mounted upon the rear end of said shaft, means for bracing and holding said member against longitudinal movement, brace bars extending between said member and the pivots of said stub axle, and means for rotating said shaft.

6. In steering mechanism for traction engines and the like, the combination with the frame, of a bracket depending therefrom, a transverse axle support having central front and rear pivots journaled in bearings in said bracket, a pair of projecting stub axles, a pair of pivot pins connecting the inner ends of said stub axles to the outer ends of said axle support, connected crank arms fixed to said stub axles, a shaft extending through and journaled in the front and rear pivots of said support, a worm fixed to said shaft between said pivots, a segmental worm wheel fixed to one of said stub axles projecting inwardly therefrom and engaging said worm, and means for rotating said shaft, substantially as described.

DAVID P. DAVIES.

Witnesses:
 FREDERICK ROBINSON,
 RICHD. ROBINSON.